C. A. FRICK.
WHEEL CONSTRUCTION.
APPLICATION FILED DEC. 4, 1909.

962,631.

Patented June 28, 1910.

WITNESSES:
C. H. Bills.
E. E. Thomas

INVENTOR.
C. A. Frick,
By Owen & Owen,
His attys.

UNITED STATES PATENT OFFICE.

CHESTER A. FRICK, OF DEFIANCE, OHIO.

WHEEL CONSTRUCTION.

962,631.

Specification of Letters Patent. Patented June 28, 1910.

Application filed December 4, 1909. Serial No. 531,314.

*To all whom it may concern:*

Be it known that I, CHESTER A. FRICK, a citizen of the United States, and a resident of Defiance, in the county of Defiance and State of Ohio, have invented a certain new and useful Wheel Construction; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to vehicle wheels, and more particularly to means for securely locking the hub ends of spokes together to prevent relative endwise, lateral, or lateral twisting movements of the spokes.

Since the advent of automobiles the ingenuity of wheel manufacturers has been taxed to the utmost to provide a wheel of sufficient strength and durability to meet the conditions of use and the various strains to which the same is subjected when employed on an automobile. In the manufacture of this class of wheels numerous strains which do not arise in other conditions of use, have to be taken into consideration, namely, first, the circumferential or rotary twisting strains due to the tendency of a heavy machine to resist a sudden starting or stopping as the shock in such cases is borne almost entirely by the wheels; secondly, the radial compressing strains due to heavy vehicles passing over ruts or obstructions, and thirdly, the lateral twisting strains of a portion of the spokes relative to others, due to skidding or the turning of corners when moving rapidly, augmented by the weight of the machine.

The object of my invention is the provision of a wheel of this class, which is simple and comparatively easy and inexpensive of manufacture, and which will meet all of the above requirements as to strength and durability.

The invention is fully described in the following specification, and a preferred embodiment of the same illustrated in the accompanying drawings, in which,—

Figure 1:
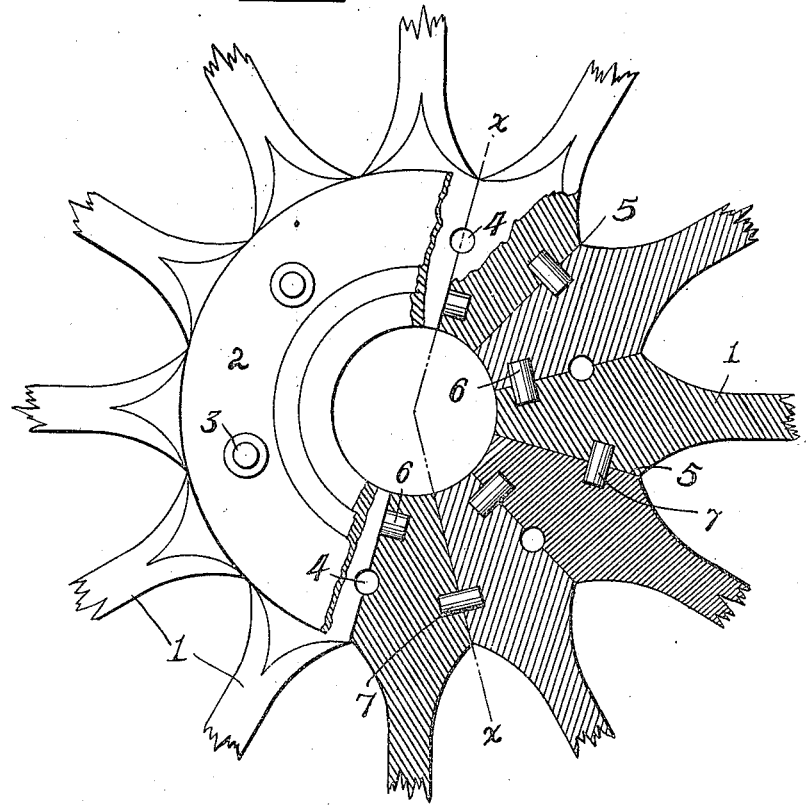
Figure 2:
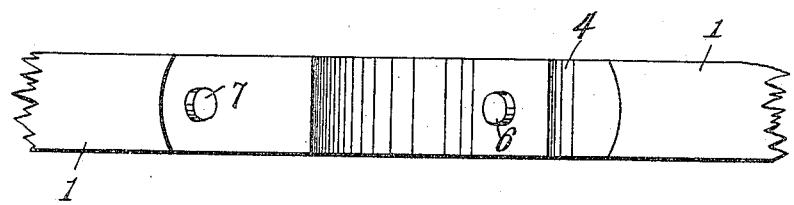

Figure 1 is a side elevation of the central or hub portion of a wheel, with a portion of the spokes in section, and Fig. 2 is a section of the same on the line $x\ x$ in Fig. 1.

Referring to the drawings, 1 designates the spokes of a wheel and 2 one of the spoke securing flanges, which flanges are secured together by the flange bolts or rivets 3. These bolts or rivets pass through apertures 4 provided in alternating ones of the seams 5 formed by the abutting sides of the hub ends of the spokes, as is customary in wheels of this class. The hub-ends of the spokes are securely held against relative movements as above specified by the provision of two sets of dowel-pins 6 and 7, which are shown as being arranged in circular form around the hub opening, one set without the other. The pins 6—7 of the two sets are preferably disposed within alternate seams 5 of the wheel, and as the sets of pins are disposed at different distances from the wheel center each spoke will be locked to one abutting spoke adjacent the inner ends of the abutting faces. This arrangement positions the locking-pins in staggered relation and effectually prevents both relative longitudinal and lateral twisting or wrenching movements. The pins 6—7 are substantially tangentially arranged relative to a circle concentric to the wheel axis and are glued or otherwise suitably secured into registering sockets provided in the abutting faces of the inner spoke ends, as indicated. Should the pins all be arranged in a common circle those on opposite sides of each spoke would form trunnions for the spoke to swing laterally on relative to the wheel. This, however, is prevented by setting the alternate pins in radially staggered relation, as each then acts as a stop against any pivotal movement of a spoke on the succeeding pin.

It is apparent that I have provided a simple and efficient wheel which is exceedingly strong in its construction and capable of withstanding very severe shocks and strains.

I wish it understood that my invention is not limited to any specific construction or arrangement of the parts except in so far as such limitations are contained in the claims.

Having thus described my invention, what I claim as new and desire to secure by Letters Patent, is,—

1. In a wheel, the combination with the abutting hub ends of spokes having registering sockets therein, of dowel-pins disposed within said sockets to lock the spokes against relative movements, said pins being arranged in staggered relation and tangentially disposed relative to circles concentric to the wheel axis.

2. In a wheel, the combination with the abutting hub ends of the spokes having registering dowel-pin sockets in their meeting faces, of dowel-pins secured within said sockets and tangentially-disposed relative to circles concentric to the wheel axis, said pins being arranged in two radially spaced circular sets, the members of which are disposed within alternate seams between the spokes, substantially as and for the purpose described.

In testimony whereof, I have hereunto signed my name to this specification in the presence of two subscribing witnesses.

CHESTER A. FRICK.

Witnesses:
  ORLANDO A. FRICK,
  JOHN W. WINN.